US010909938B2

(12) United States Patent
Kim et al.

(10) Patent No.: US 10,909,938 B2
(45) Date of Patent: Feb. 2, 2021

(54) DISPLAY DEVICE AND METHOD OF DRIVING THE SAME

(71) Applicant: Samsung Display Co., Ltd., Yongin-Si (KR)

(72) Inventors: Dong Keon Kim, Cheonan-si (KR); Wonjong Ohn, Seongnam-si (KR); Moah Choi, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 16/400,311

(22) Filed: May 1, 2019

(65) Prior Publication Data

US 2020/0051515 A1 Feb. 13, 2020

(30) Foreign Application Priority Data

Aug. 8, 2018 (KR) ........................ 10-2018-0092156

(51) Int. Cl.

*G06F 3/038* (2013.01)
*G09G 3/36* (2006.01)

(52) U.S. Cl.

CPC ......... *G09G 3/3614* (2013.01); *G09G 3/3688* (2013.01); *G09G 2300/0426* (2013.01); *G09G 2310/0286* (2013.01); *G09G 2310/08* (2013.01); *G09G 2320/0257* (2013.01)

(58) Field of Classification Search

USPC ......... 345/87, 151, 618, 690, 691, 211, 214, 345/215, 209, 204, 89, 694; 257/59
See application file for complete search history.

(56) References Cited

U.S. PATENT DOCUMENTS

| | | | | |
|---|---|---|---|---|
| 9,607,562 | B2 | 3/2017 | Kim et al. | |
| 2004/0070581 | A1* | 4/2004 | Hiraki | G09G 3/3648 345/209 |
| 2006/0012593 | A1* | 1/2006 | Iriguchi | G09G 3/003 345/204 |
| 2007/0164952 | A1* | 7/2007 | Kim | G09G 3/3406 345/87 |
| 2007/0200810 | A1* | 8/2007 | Kawata | G09G 3/3611 345/89 |
| 2008/0186296 | A1* | 8/2008 | Tokumura | G09G 3/3614 345/209 |
| 2008/0291223 | A1* | 11/2008 | Yamazaki | G09G 3/3677 345/690 |
| 2009/0295786 | A1* | 12/2009 | Ito | G09G 3/3648 345/215 |

(Continued)

FOREIGN PATENT DOCUMENTS

| | | |
|---|---|---|
| KR | 1020160008013 A | 1/2016 |
| KR | 1020160084885 A | 7/2016 |

*Primary Examiner* — Thuy N Pardo
(74) *Attorney, Agent, or Firm* — Cantor Colburn LLP

(57) ABSTRACT

A display device includes a data driver which outputs a data voltage of a positive polarity or a negative polarity to a data line based on the polarity control signal by a horizontal period, and a number of a positive horizontal period, in which the data voltage of the positive polarity is outputted to the data line, in a frame period is different from a number of a negative horizontal period, in which the data voltage of the negative polarity is outputted to the data line, in the frame period when the frame image data satisfy a condition of an afterimage pattern.

20 Claims, 8 Drawing Sheets

(56) References Cited

U.S. PATENT DOCUMENTS

| | | | | |
|---|---|---|---|---|
| 2009/0310077 | A1* | 12/2009 | Kim | G09G 3/3614 349/151 |
| 2010/0001279 | A1* | 1/2010 | Hisada | H01L 27/1255 257/59 |
| 2010/0214316 | A1* | 8/2010 | Kim | G09G 3/3611 345/618 |
| 2011/0012893 | A1* | 1/2011 | Iriguchi | G09G 3/3648 345/214 |
| 2013/0069928 | A1* | 3/2013 | Mizusako | G09G 3/3614 345/212 |
| 2014/0022225 | A1* | 1/2014 | Lee | G09G 3/3648 345/211 |
| 2014/0267464 | A1* | 9/2014 | Takamaru | G09G 3/3648 345/690 |
| 2014/0313113 | A1* | 10/2014 | Jang | G09G 3/3614 345/87 |
| 2014/0333516 | A1* | 11/2014 | Park | G09G 3/3614 345/89 |
| 2015/0339993 | A1* | 11/2015 | Xiao | G09G 3/3614 345/211 |
| 2016/0125822 | A1* | 5/2016 | Kang | G09G 3/3406 345/691 |
| 2016/0189656 | A1* | 6/2016 | Park | G02F 1/13624 345/694 |
| 2018/0342219 | A1* | 11/2018 | Park | G09G 3/006 345/690 |

* cited by examiner

<n_th FRAME>

<(n+1)_th FRAME>

<n_th FRAME>

DISPLAY DEVICE AND METHOD OF DRIVING THE SAME

This application claims priority to Korean Patent Application No. 10-2018-0092156, filed on Aug. 8, 2018, and all the benefits accruing therefrom under 35 U.S.C. § 119, the content of which in its entirety is herein incorporated by reference.

BACKGROUND

1. Field

Exemplary embodiments of the invention relate to a display device and a method of driving the display device. More particularly, exemplary embodiments of the invention relate a display device with improved display quality and a method of driving the display device.

2. Description of the Related Art

A liquid crystal display ("LCD") device typically includes an LCD panel for displaying an image using light transmittance of a liquid crystal and a backlight assembly disposed under the LCD panel and providing light to the liquid crystal display panel.

The LCD panel may include an array substrate on which pixel electrodes are disposed, an opposing substrate on which common electrodes are disposed, and a liquid crystal layer disposed between the array substrate and the opposing substrate. The liquid crystal layer may display an image by controlling the light transmittance thereof based on the potential difference applied to the pixel electrode and the common electrode.

SUMMARY

In a liquid crystal display ("LCD") panel, a residual image may be seen by a residual direct-current ("DC") component due to an asymmetric voltage and impurities applied to the liquid crystal layer.

Exemplary embodiments of the invention provide a display device with improved display quality.

Exemplary embodiments of the invention provide a method of driving the display device.

According to an exemplary embodiment of the invention, a display device includes a display panel including a pixel connected to a data line and a gate lines, an image data analyzer which analyzes whether frame image data satisfy a condition of an afterimage pattern, a polarity signal controller which generates a polarity control signal to control a polarity of a data voltage applied to the data line to be a positive polarity or a negative polarity with respect to a reference voltage, and a data driver which outputs the data voltage of the positive polarity or the negative polarity to the data line based on the polarity control signal by a horizontal period, where a number of a positive horizontal period, in which the data voltage of the positive polarity is outputted to the data line, in a frame period is different from a number of a negative horizontal period, in which the data voltage of the negative polarity is outputted to the data line, in the frame period when the frame image data satisfy the condition of the afterimage pattern In an exemplary embodiment, the number of the negative horizontal period in the frame period may be less than the number of the positive horizontal period in the frame period when the frame image data satisfy the condition of the afterimage pattern.

In an exemplary embodiment, a difference between the number of the negative horizontal period in the frame period and the number of the positive horizontal period in the frame period may increase when a charge rate difference between the data voltages of the positive polarity and the negative polarity may increase.

In an exemplary embodiment, the number of the negative horizontal period in the frame period and the number of the positive horizontal period in the frame period may be determined based on an offset of the reference voltage by a kickback.

In an exemplary embodiment, the number of the negative horizontal period in the frame period may be equal to the positive horizontal period in the frame period when the frame image data do not satisfy the condition of the afterimage pattern.

In an exemplary embodiment, the polarity signal controller may generate a first polarity control signal to control the polarity of the data voltage based on a first polarity pattern, in which a polarity of the data voltage is predetermined for every horizontal period, and a second polarity control signal to control the polarity of the data voltage based on a second polarity pattern, which is inverted with the first polarity pattern.

In an exemplary embodiment, the polarity signal controller may change the first polarity control signal and the second polarity control signal from one to the other by a predetermined horizontal period, when the frame image data satisfy the condition of the afterimage pattern.

In an exemplary embodiment, the polarity signal controller may change the first polarity control signal and the second polarity control signal from one to the other by a predetermined frame period, when the frame image data do not satisfy the condition of the afterimage pattern.

In an exemplary embodiment, the afterimage pattern may include a black image and a white image which are arranged as a grid shape.

In an exemplary embodiment, the data driver may include a gamma voltage generator which generates gamma-data into a gamma voltage of the positive polarity or a gamma voltage of the negative polarity based on the polarity control signal and a digital-to-analog converter which converts image data to the data voltage of the positive polarity or the data voltage of the negative polarity using the gamma voltage of the positive polarity or the gamma voltage of the negative polarity.

According to an exemplary embodiment of the invention, a method of driving a display device, which includes a pixel connected to a data line and a gate line, includes analyzing whether frame image data satisfy a condition of an afterimage pattern, generating a polarity control signal to control a polarity of a data voltage applied to the data line to be a positive polarity or a negative polarity with respect to a reference voltage, and outputting the data voltage of the positive polarity or the negative polarity to the data line based on the polarity control signal by a horizontal period, where a number of a positive horizontal period, in which the data voltage of the positive polarity is outputted to the data line, in a frame period is different from a number of a negative horizontal period, in which the data voltage of the negative polarity is outputted to the data line, in the frame period when the frame image data satisfy the condition of the afterimage pattern.

In an exemplary embodiment, the number of the negative horizontal period in the frame period may be less than the number of the positive horizontal period in the frame period when the frame image data satisfy the condition of the afterimage pattern.

In an exemplary embodiment, a difference between the number of the negative horizontal period in the frame period and the number of the positive horizontal period in the frame period may increase when a charge rate difference between the data voltages of the positive polarity and the negative polarity may increase.

In an exemplary embodiment, the number of the negative horizontal period in the frame period and the number of the positive horizontal period in the frame period may be determined based on an offset of the reference voltage by a kickback.

In an exemplary embodiment, the number of the negative horizontal period in the frame period may be equal to the positive horizontal period in the frame period when the frame image data do not satisfy the condition of the afterimage pattern.

In an exemplary embodiment, the generating the polarity control signal may include generating a first polarity control signal to control the polarity of the data voltage based on a first polarity pattern, in which a polarity of the data voltage is predetermined for every horizontal period, and a second polarity control signal to control the polarity of the data voltage based on a second polarity pattern which is inverted with the first polarity pattern.

In an exemplary embodiment, the generating the polarity control signal may further include changing the first polarity control signal and the second polarity control signal from one to the other by a predetermined horizontal period, when the frame image data satisfy the condition of the afterimage pattern.

In an exemplary embodiment, the generating the polarity control signal may further include changing the first polarity control signal and the second polarity control signal from one to the other by a predetermined frame period, when the frame image data do not satisfy the condition of the afterimage pattern.

In an exemplary embodiment, the afterimage pattern may include a black image and a white image which are arranged as a grid shape.

In an exemplary embodiment, the method may further include generating gamma-data into a gamma voltage of the positive polarity or a gamma voltage of the negative polarity based on the polarity control signal and converting image data to the data voltage of the positive polarity or the data voltage of the negative polarity using the gamma voltage of the positive polarity or the gamma voltage of the negative polarity.

According to exemplary embodiments of the invention, when the image data of the frame are the abnormal image data that satisfy the condition of the afterimage pattern, the positive polarity and negative polarity of the data voltage applied to the data line may have an asymmetric structure. By the kickback effect, a charge rate of a negative polarity data voltage is greater than the charge rate of a positive polarity data voltage. Thus, the first and second polarity control signals may be changed from one to the other by a preset horizontal period in a way such that a number of the data voltage having the negative polarity and applied to a data line, in a frame period is less than a number of the data voltage having the positive polarity and applied to the date line in the frame period. The charge rate difference between the data voltages of the positive polarity in the frame period and the negative polarity voltage in the frame period may be compensated and thus, the afterimage may be effectively prevented.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
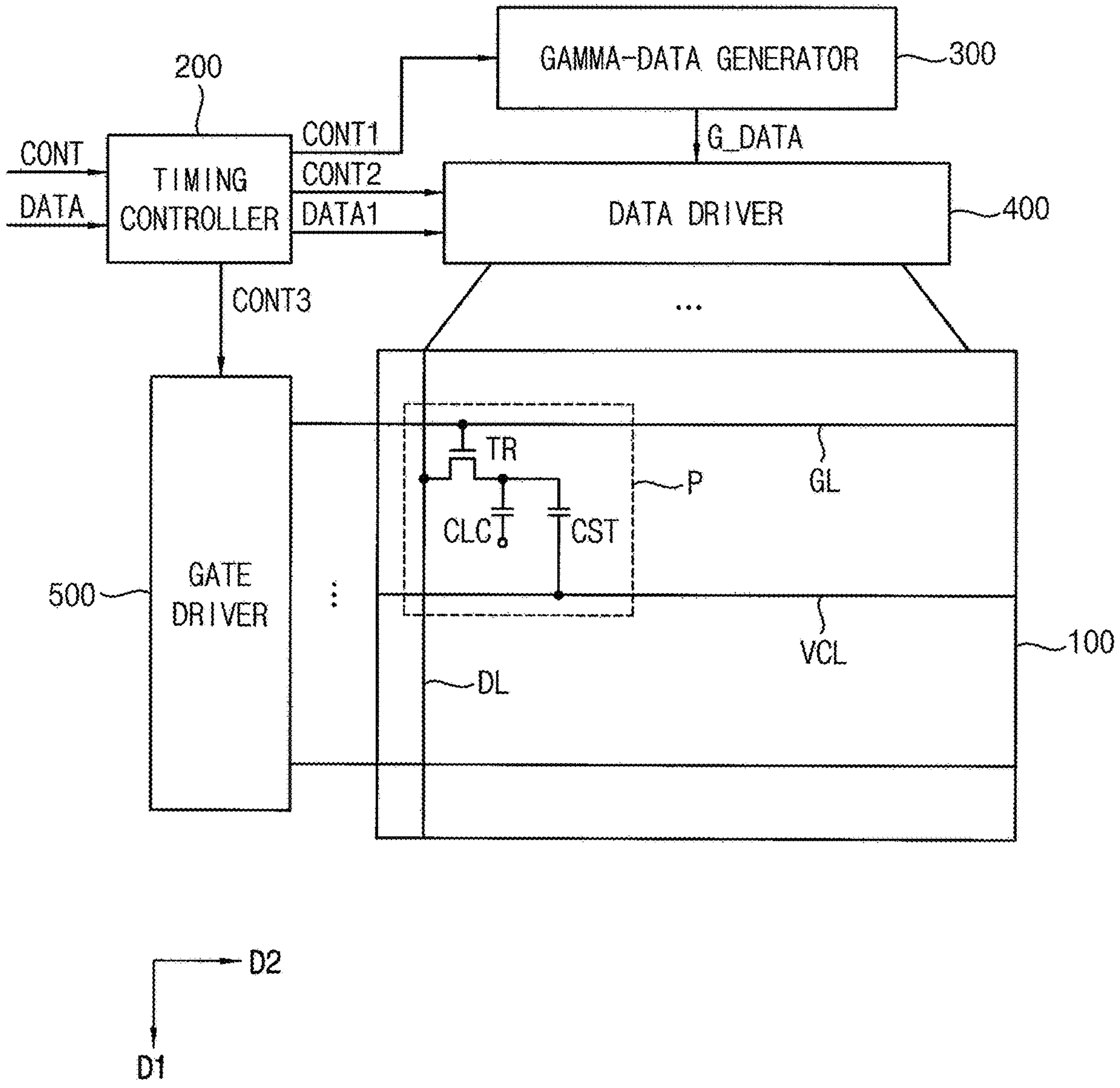
FIG. 1 is a block diagram illustrating a display device according to an exemplary embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "connected to" another element, it can be directly connected to the other element or intervening elements may be present therebetween. In contrast, when an element is referred to as being "directly connected to" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. "At least one of A and B" means "A or B." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the invention will be described in detail with reference to the accompanying drawings.

FIG. 1 is a block diagram illustrating a display device according to an exemplary embodiment.

Referring to FIG. 1, an exemplary embodiment of the display device may include a display panel 100, a timing controller 200, a gamma-data generator 300, a data driver 400 and a gate driver 500.

The display panel 100 may include a plurality of data lines DL, a plurality of gate lines GL, a plurality of common voltage lines VCL and a plurality of pixels P. The plurality of data lines DL extends in a first direction D1 and is arranged in a second direction D2 crossing the first direction D1. The plurality of gate lines GL extends in the second direction D2 and is arranged in the first direction D1. The plurality of common voltage lines VCL extends in the second direction D2 and is arranged in the first direction D1.

The plurality of pixel P may be arranged in a matrix type form including a plurality of pixel rows and a plurality of pixel columns. Each of the pixels P may include a color filter.

Each of the pixel P may include a switching transistor TR connected to a corresponding data line among the plurality of data lines DL and a corresponding gate line among the plurality of gate lines GL, a liquid crystal capacitor CLC connected to the switching transistor TR and a storage capacitor CST connected to the liquid crystal capacitor CLC. A corresponding common voltage line among the plurality of common voltage lines VCL may transfer a common voltage Vcom (shown in FIG. 2) to a common electrode of the storage capacitor. The liquid crystal capacitor CLC may receive the common voltage Vcom applied to the storage capacitor CST. The common voltage Vcom may be a reference voltage of a positive polarity data voltage and a negative polarity data voltage.

The timing controller 200 may generally control an operation of the display device. The timing controller 200 may receive image data DATA and a control signal CONT from an external device, e.g., an external graphics device.

The timing controller 200 may correct the image data DATA using a preset correction algorithm, and outputs corrected image data DATA1 to the data driver 400.

The timing controller 200 is configured to generate a plurality of control signals for driving the display panel 100 based on the control signal CONT. The plurality of control signals may include a first control signal CONT1 for controlling the gamma-data generator 300, a second control signal CONT2 for controlling the data driver 400, and a third control signal CONT3 for controlling the gate driver 500.

The gamma-data generator 300 is configured to generate a plurality of gamma-data G_DATA, to which a symmetric gamma and an asymmetric gamma are applied, based on the corrected image data DATA1 and the first control signal CONT1. In an exemplary embodiment, the gamma-data generator 300 may include a symmetric gamma look-up table storing gamma-data respectively corresponding to a plurality of sampling grayscales applied to the symmetric gamma. In such an embodiment, the gamma-data generator 300 may include an asymmetric gamma look-up table storing gamma-data respectively corresponding to a plurality of sampling grayscales applied to the asymmetric gamma.

The data driver 400 is configured to convert the corrected image data DATA1 to a positive polarity data voltage or a negative polarity data voltage using the gamma-data based on the second control signal CONT2, and outputs the positive polarity data voltage or the negative polarity data voltage to the data line DL.

According to an exemplary embodiment, the second control signal CONT2 may include a polarity control signal for controlling a polarity of the data voltage.

In an exemplary embodiment, when frame image data satisfy a condition of an afterimage pattern, the timing controller 200 is configured to generate a first polarity control signal POL1 that changes by every m horizontal periods within a frame period ('m' is a natural number). The m horizontal periods may be predetermined by the charge rate difference between the positive polarity data voltage and the negative polarity data voltage depending on the kickback voltage. Accordingly, in such an embodiment, the charge rate difference between the positive polarity data voltage and the negative polarity data voltage is eliminated by using a polarity inversion period of the data voltage and thus, the afterimage due to a kickback voltage may be effective prevented or substantially reduced.

In such an embodiment, when the frame image data do not satisfy the condition of the afterimage pattern, the timing controller 200 is configured to generate a second polarity control signal POL2 that changes by the frame period.

The gate driver 500 is configured to generate a plurality of gate signals and sequentially output the gate signals to the gate lines GL of the display panel 100. The gate driver 500 may include a shift-register including a plurality of transistors integrated directly into the display panel 100.

Figure 2:
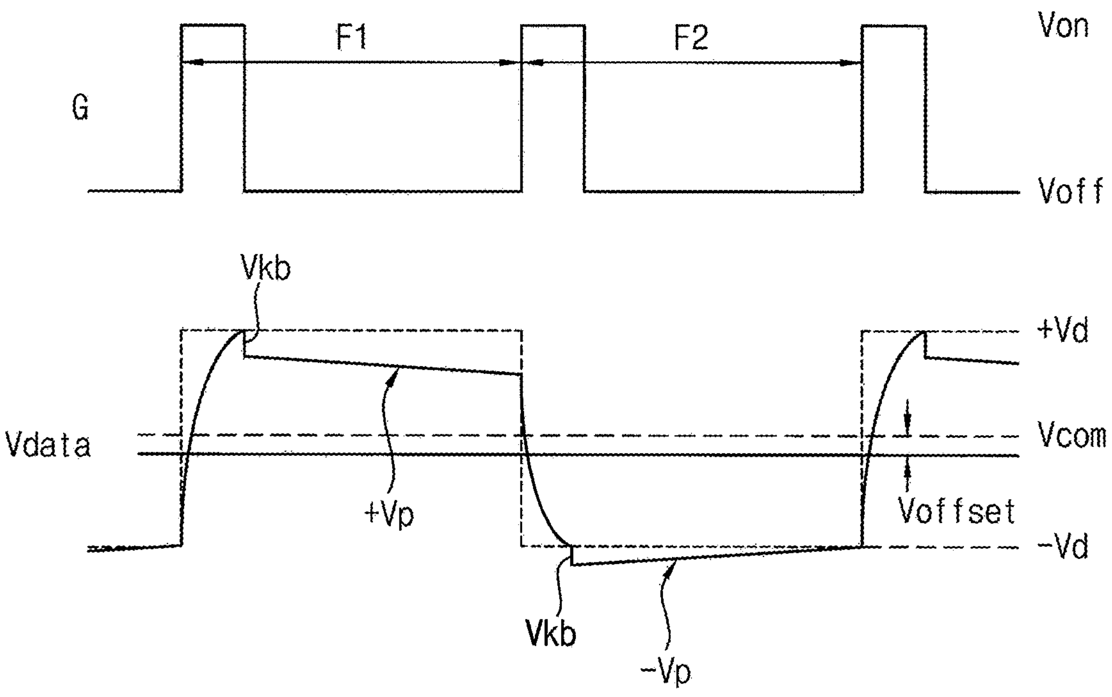
FIG. 2 is a conceptual diagram illustrating a charge rate of a data voltage charged in a pixel according to a polarity inversion mode.

FIG. 2 is a conceptual diagram illustrating a charge rate of a data voltage charged in a pixel according to a polarity inversion mode.

Referring to FIGS. 1 and 2, a gate line GL connected to a pixel P receives a gate signal G and a data line DL connected to the pixel P receives a data voltage Vdata.

According to a polarity inversion mode, the positive polarity data voltage +Vd is applied to the pixel P in a first frame F1, and the negative polarity data voltage −Vd is applied to the pixel P in a second frame F2.

In one exemplary embodiment, for example, in the first frame F1, when the gate signal G applied to the gate line GL changes from a low voltage Voff to a high voltage Von, the positive polarity data voltage +Vd applied to the data line DL starts to be charged to the liquid crystal capacitor CLC of the pixel P.

When the gate signal G changes from the high voltage Von to the low voltage Voff, the positive polarity charge voltage +Vp charged to the pixel P decreases by the kickback voltage Vkb. In one exemplary embodiment, for example, when the charge amount fluctuating by the kickback voltage is 5%, the charge amount of the positive polarity corresponding to the positive polarity charge voltage +Vp is reduced to 95%.

Then, in the second frame F2, when the gate signal G applied to the gate line GL changes from the low voltage Voff to the high voltage Von, the negative polarity data voltage −Vd applied to the data line DL starts to be charged to the liquid crystal capacitor CLC of the pixel P.

When the gate signal G changes from the high voltage Von to the low voltage Voff, the negative polarity charge voltage −Vp charged to the pixel P increases by the kickback voltage Vkb. In one exemplary embodiment, for example, when the charge amount fluctuating by the kickback voltage is 5%, the charge amount of the negative polarity corresponding to the negative polarity charge voltage −Vp is increased to 105%.

Therefore, the common voltage Vcom shifts to the negative polarity side by the offset voltage Voffset due to the kickback voltage. As the common voltage Vcom changes, residual direct-current ("DC") components due to the asymmetry of the positive polarity and the negative polarity are accumulated in the display panel, resulting in a DC residual afterimage.

According to an exemplary embodiment, the polarity inversion mode may be controlled to allow the offset voltage Voffset of the common voltage Vcom to be zero for eliminating the residual DC components.

According to an exemplary embodiment, the frame image data are analyzed and then the polarity inversion mode applied to the display panel is adjusted when the frame image data satisfy the condition of the afterimage pattern. Thus, the residual DC components are effectively compensated to eliminate the afterimage.

Figure 3:
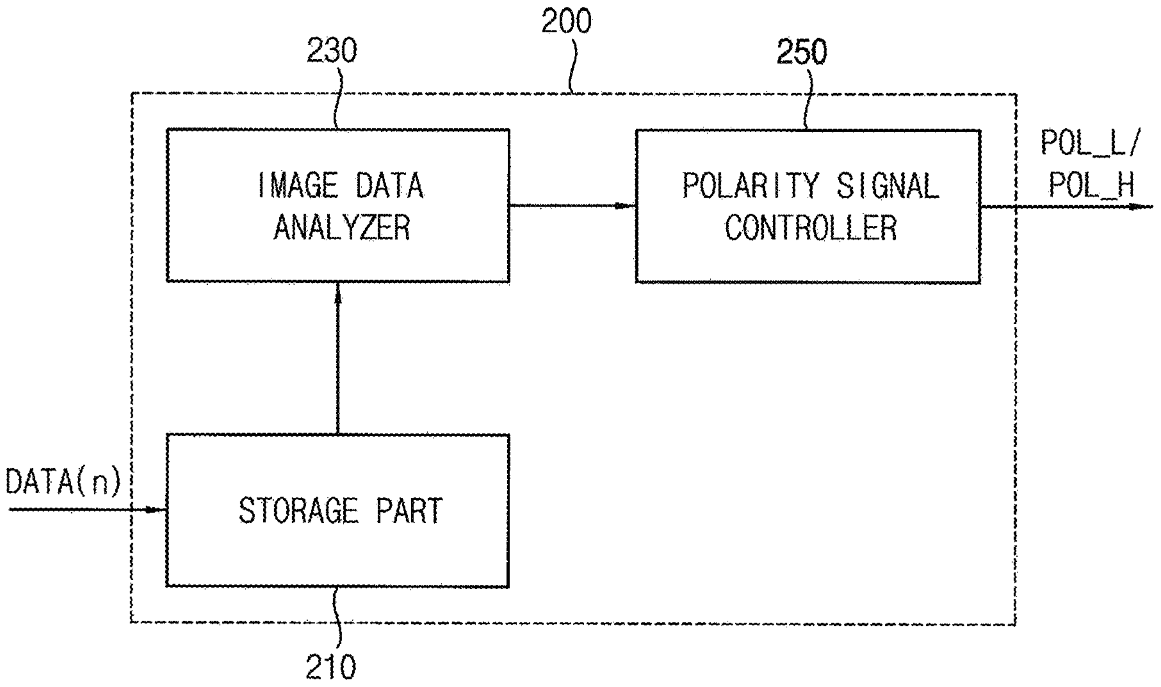
FIG. 3 is a block diagram illustrating a timing controller according to an exemplary embodiment.
Figure 4:
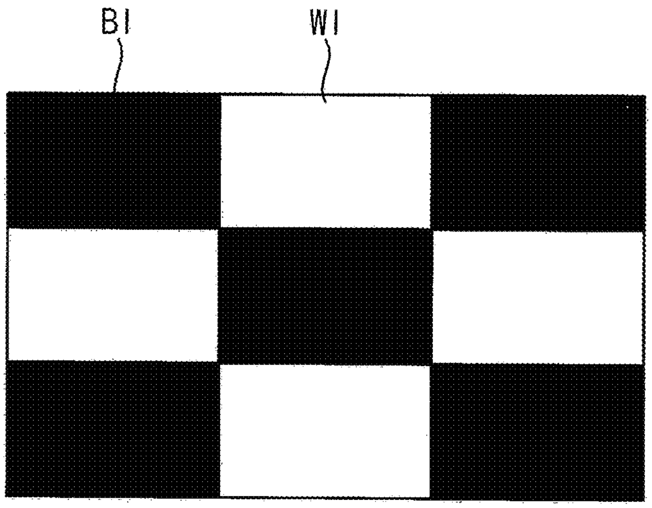
FIG. 4 is a conceptual diagram illustrating an afterimage pattern according to an exemplary embodiment.

FIG. 3 is a block diagram illustrating a timing controller according to an exemplary embodiment. FIG. 4 is a conceptual diagram illustrating an afterimage pattern according to an exemplary embodiment.

Referring to FIGS. 1 and 3, an exemplary embodiment of the timing controller 200 may include a storage part 210, an image data analyzer 230 and a polarity signal controller 250.

The storage part 210 is configured to store the image data of the frame. The storage part 210 may be a frame memory used for a dynamic capacitance compensation ("DCC") to improve the response time of the liquid crystal.

The image data analyzer 230 is configured to analyze the image data DATA(n) of a currently received frame.

In one exemplary embodiment, for example, the image data analyzer 230 is configured to determine whether the image data DATA(n) of the frame are abnormal image data satisfying the condition of the afterimage pattern or normal image data not satisfying the condition of the afterimage pattern.

In such an embodiment, the image data analyzer 230 is configured to provide a first information signal to the polarity signal controller 250 when the image data of the frame is the normal image data.

In such an embodiment, the image data analyzer 230 is configured to provide a second information signal to the polarity signal controller 250 when the image data of the frame are the abnormal image data that satisfy the condition of the afterimage pattern, in which the black image BI and the white image WI are arranged as a grid shape, as shown in FIG. 4.

The polarity signal controller 250 is configured to generate a first polarity control signal POL_L and a second polarity control signal POL_H that control the polarity of the data voltage. The first polarity control signal POL_L may control the polarity of the data voltage to have a first polarity pattern with a preset polarity by a horizontal period. The second polarity control signal POL_H may control the polarity of the data voltage to have a second polarity pattern with a preset polarity opposite to the first polarity pattern by a horizontal period.

TABLE 1

| | Y1 | Y2 | Y3 | Y4 | Y5 | Y6 | Y7 |
|---|---|---|---|---|---|---|---|
| POL_H | − | + | − | + | − | + | − |
| POL_L | + | − | + | − | + | − | + |
| | Y8 | Y9 | Y10 | Y11 | Y12 | Y13 | Y14 | --- |
| POL_H | + | − | + | − | + | − | + | --- |
| POL_L | − | + | − | + | − | + | − | --- |

Table 1 shows the positive polarity (+) and the negative polarity (−) of the data voltage applied to one data line by every horizontal period Y1, Y2, Y3, . . . based on the first and second polarity control signals POL_L and POL_H.

Referring to Table 1, the first polarity control signal POL_L controls the polarity of the data voltage applied to the data line by every horizontal period Y1, Y2, Y3, . . . to have the first polarity pattern (+, −, +, −, +, −, . . . ). The second polarity control signal POL_H controls the polarity of the data voltage applied to the data line by every horizontal period Y1, Y2, Y3, . . . to have the second polarity pattern (−, +, −, +, −, +, . . . ) opposite to the first polarity pattern. In an exemplary embodiment, the first and second polarity patterns may be a 1-dot polarity pattern that inverts every horizontal period. Alternatively, the first and second polarity patterns may be a 2-dot polarity pattern that inverts every two horizontal periods. Alternatively, the first and second polarity patterns may be a preset polarity pattern that inverts by a preset horizontal period.

The polarity signal controller 250 may control a change period of the first and second polarity control signals POL_L and POL_H based on an image data information provided from the image data analyzer 230 by every frame period.

In an exemplary embodiment, the polarity signal controller 250 may change the first and second polarity control signals POL_L and POL_H from one to the other by every frame period when the image data are the normal image data.

The following Table 2 shows the polarity of the data voltage applied to the data line every horizontal period Y1, Y2, Y3, . . . , Y28 of the frame according to the control of the first polarity control signal POL_L.

TABLE 2

| | Y1 | Y2 | Y3 | Y4 | Y5 | Y6 | Y7 | Y8 | Y9 | Y10 | Y11 | Y12 | Y13 | Y14 | |
|---|---|---|---|---|---|---|---|---|---|---|---|---|---|---|---|
| POL | | | | | | | | L | | | | | | | |
| DATA pol | + | − | + | − | + | − | + | − | + | − | + | − | + | − | |
| | Y15 | Y16 | Y17 | Y18 | Y19 | Y20 | Y21 | Y22 | Y23 | Y24 | Y25 | Y26 | Y27 | Y28 | |
| POL | | | | | | | L | | | | | | | | +Number 14 |
| DATA pol | + | − | + | − | + | − | + | − | + | − | + | − | + | − | −Number 14 |

The following Table 3 shows the polarity of the data voltage applied to the data line every horizontal period Y1, Y2, Y3, . . . , Y28 of the frame according to the control of the second polarity control signal POL_H.

TABLE 3

| | Y1 | Y2 | Y3 | Y4 | Y5 | Y6 | Y7 | Y8 | Y9 | Y10 | Y11 | Y12 | Y13 | Y14 | | |
|---|---|---|---|---|---|---|---|---|---|---|---|---|---|---|---|---|
| POL | | | | | | | | H | | | | | | | | |
| DATA pol | − | + | − | + | − | + | − | + | − | + | − | + | − | + | | |
| | Y15 | Y16 | Y17 | Y18 | Y19 | Y20 | Y21 | Y22 | Y23 | Y24 | Y25 | Y26 | Y27 | Y28 | | |
| POL | | | | | | | H | | | | | | | | +Number | 14 |
| DATA pol | − | + | − | + | − | + | − | + | − | + | − | + | − | + | −Number | 14 |

In such an embodiment, the polarity signal controller 250 changes the first polarity control signal POL_L and the second polarity control signal POL_H by a preset horizontal period when the image data are the abnormal image data.

In one exemplary embodiment, for example, when the image data of an n-th frame are the abnormal image data satisfying the condition of the afterimage pattern, the polarity signal controller 250 changes the first polarity control signal POL_L and the second polarity control signal POL_H by the preset horizontal period in the n-th frame.

The following Table 4 shows the polarity of the data voltage applied to the data line every 7-horizontal periods Y1, Y2, Y3, . . . , Y28 when the preset horizontal period of the first polarity control signal POL_L and the second polarity control signal POL_H are predetermined as 7-horizontal periods data voltage has the positive polarity (+), in the frame period is 16 and a number of a negative horizontal period, in which the data voltage has the negative polarity (−), in the frame period is 12.

Therefore, in such an embodiment, the charge rate difference between the positive polarity (+) and the negative polarity (−) by the kickback effect of about 16%, for example, ((16/12)−1)/2=0.15, may be compensated.

In an exemplary embodiment, the first and second polarity control signals POL_L, POL_H are changed by every 21 horizontal periods in the frame period and thus, the number of the positive horizontal period, in which the data voltage has the positive polarity (+), in the frame period is 22 and the number of the negative horizontal period, in which the data voltage has the negative polarity (−), in the frame period is 20.

Therefore, in such an embodiment, the charge rate difference between the positive polarity (+) and the negative polarity (−) by the kickback effect of about 5%, for example, ((22/20)−1)/2=0.05, may be compensated.

TABLE 4

| | Y1 | Y2 | Y3 | Y4 | Y5 | Y6 | Y7 | Y8 | Y9 | Y10 | Y11 | Y12 | Y13 | Y14 | | |
|---|---|---|---|---|---|---|---|---|---|---|---|---|---|---|---|---|
| POL | | | | L | | | | | | | H | | | | | |
| DATA pol | + | − | + | − | + | − | + | + | − | + | − | + | − | + | | |
| | Y15 | Y16 | Y17 | Y18 | Y19 | Y20 | Y21 | Y22 | Y23 | Y24 | Y25 | Y26 | Y27 | Y28 | | |
| POL | | | | L | | | | | | | H | | | | +Number | 16 |
| DATA pol | + | − | + | − | + | − | + | + | − | + | − | + | − | + | −Number | 12 |

Referring to Table 1 and Table 4, during first to seventh horizontal period Y1, . . . , Y7, the data voltages have polarities such as (+, −, +, −, +, −, +) which are preset in the first to seventh horizontal periods Y1, . . . , Y7 in response to the first polarity control signal POL_L. During eighth to fourteenth horizontal periods Y8, . . . , Y14, the data voltages have polarities such as (+, −, +, −, +, −, +) which are preset in the first to seventh horizontal periods Y8, . . . , Y14 in response to the second polarity control signal POL_H. During 15-th to 21st horizontal periods Y15, . . . , Y21, the data voltages have polarities such as (+, −, +, −, +, −, +) which are preset in the 15-th to 21st horizontal periods Y15, . . . , Y21 in response to the first polarity control signal POL_L. During 22-th to 28-th horizontal periods Y22, . . . , Y28, the data voltages have polarities such as (+, −, +, −, +, −, +) which are preset in the 22-th to 28-th horizontal periods Y22, . . . , Y28 in response to the second polarity control signal POL_H.

In one exemplary embodiment, for example, as shown in Table 4, the first and second polarity control signals POL_L, POL_H are changed from one to the other (or alternately applied) every 7-horizontal periods in the frame period, and thus, a number of a positive horizontal period, in which the The number of the negative horizontal period and the number of the positive horizontal period in a frame period may be determined based on an offset of the reference voltage by the kickback effect.

In an exemplary embodiment, a difference between the number of the negative horizontal period and the number of the positive horizontal period in a frame period may increase when the charge rate difference between the data voltages of the positive polarity and the negative polarity may increase.

In an exemplary embodiment, as described above, when the image data of the frame are the abnormal image data that satisfy the condition of the afterimage pattern, the first and second polarity control signals POL_L and POL_H are changed from one to the other by a preset horizontal period such that a ratio the positive polarity and the negative polarity for the data voltage applied to the data line is adjusted. Thus, the charge rate difference between the positive polarity and the negative polarity by the kickback effect may be compensated.

Figure 5:
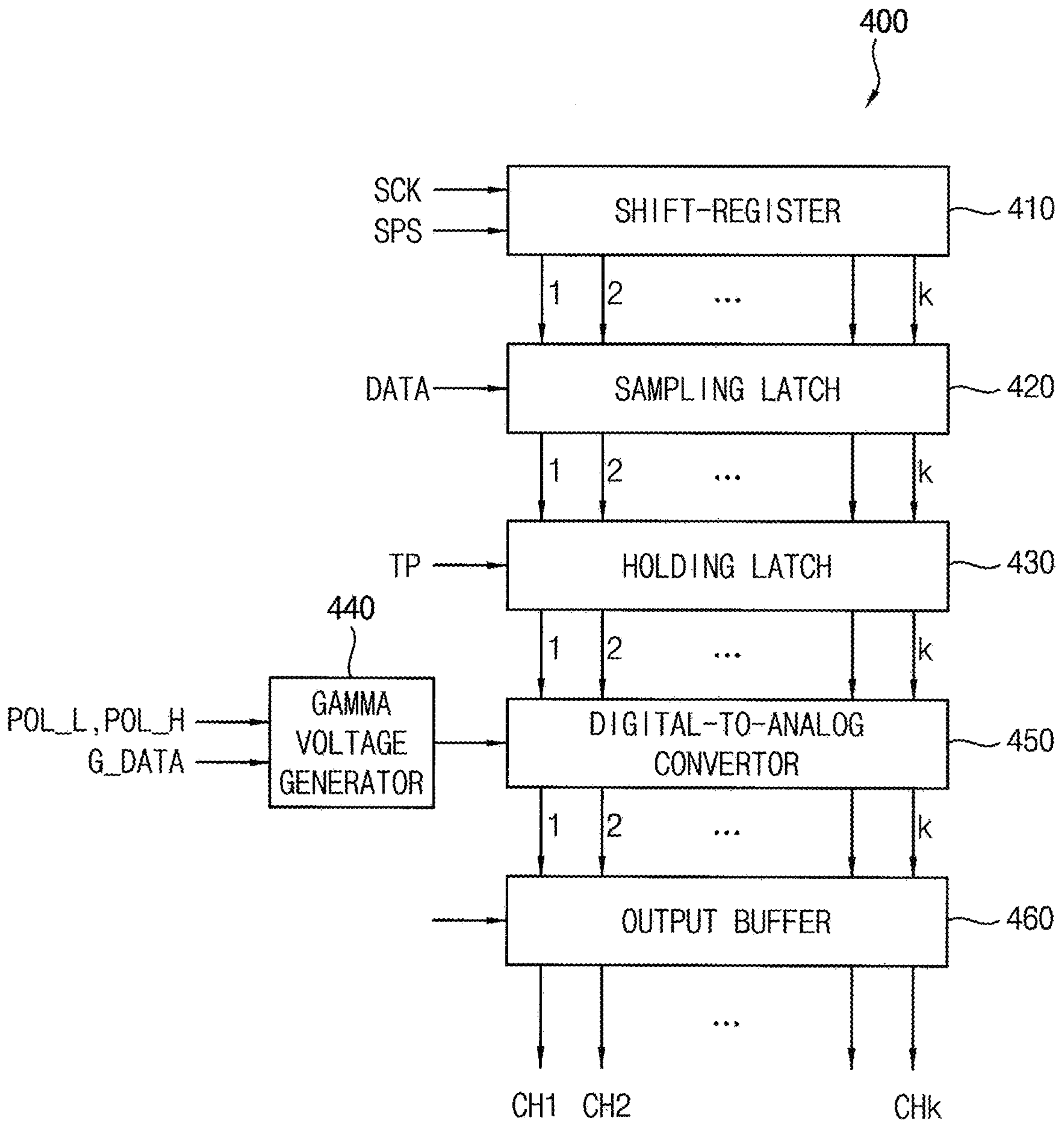
FIG. 5 is a block diagram illustrating a data driver according to an exemplary embodiment.
Figure 6A:
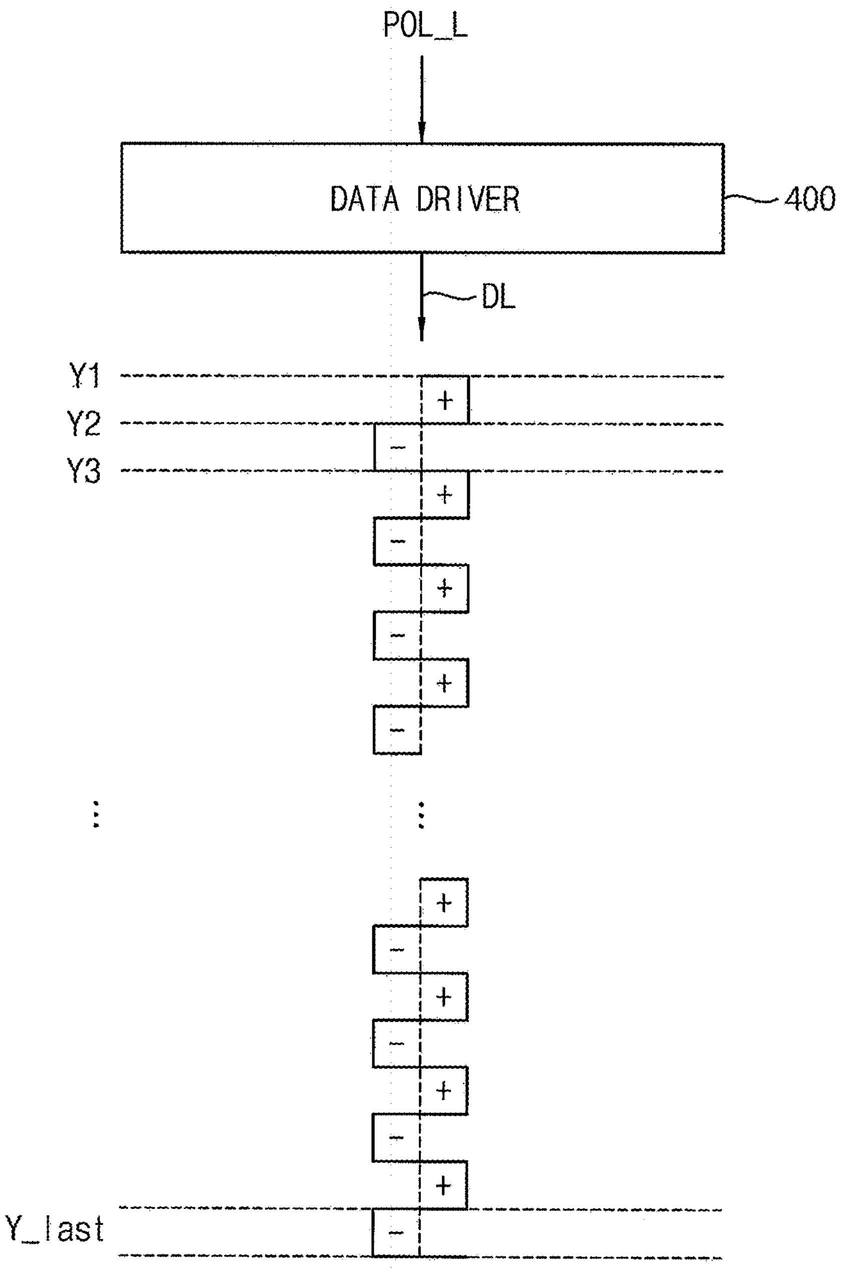
FIGS. 6A and 6B are conceptual diagrams illustrating a method of controlling a polarity for normal image data according to an exemplary embodiment.
Figure 6B:
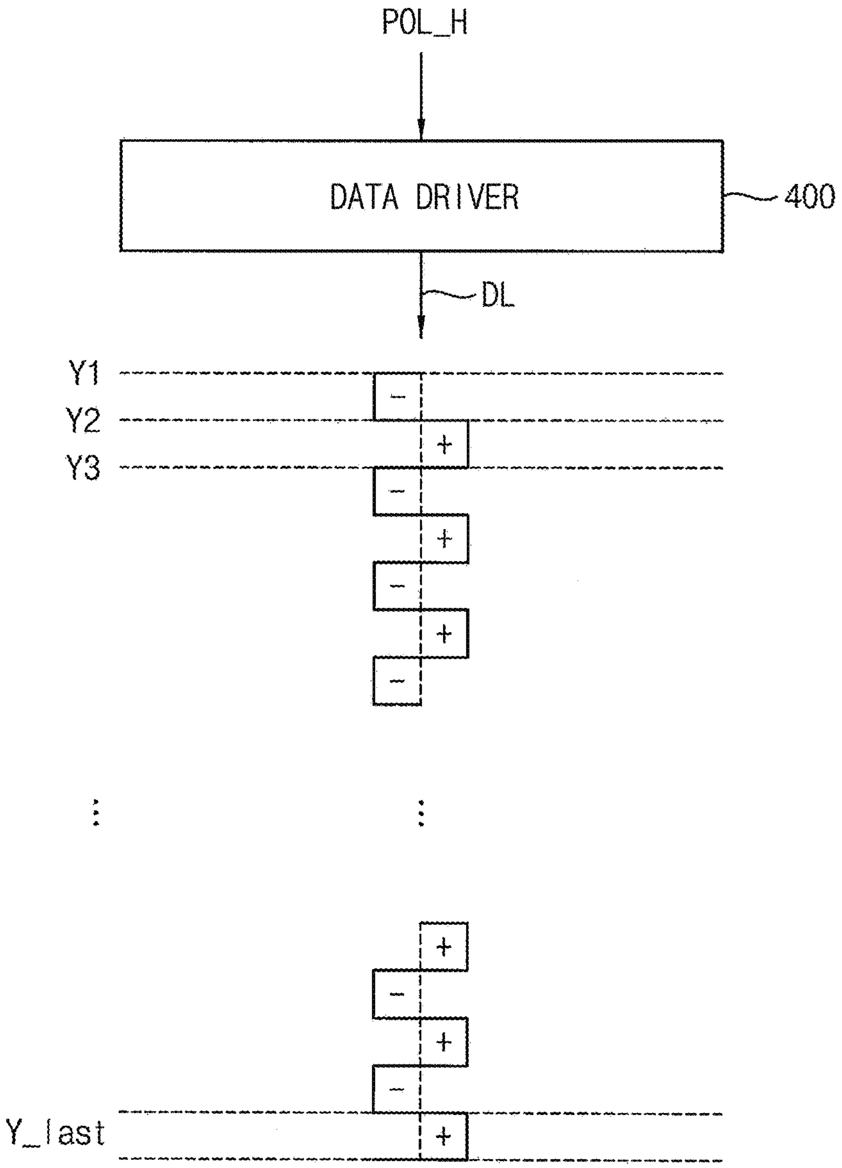
Figure 7:
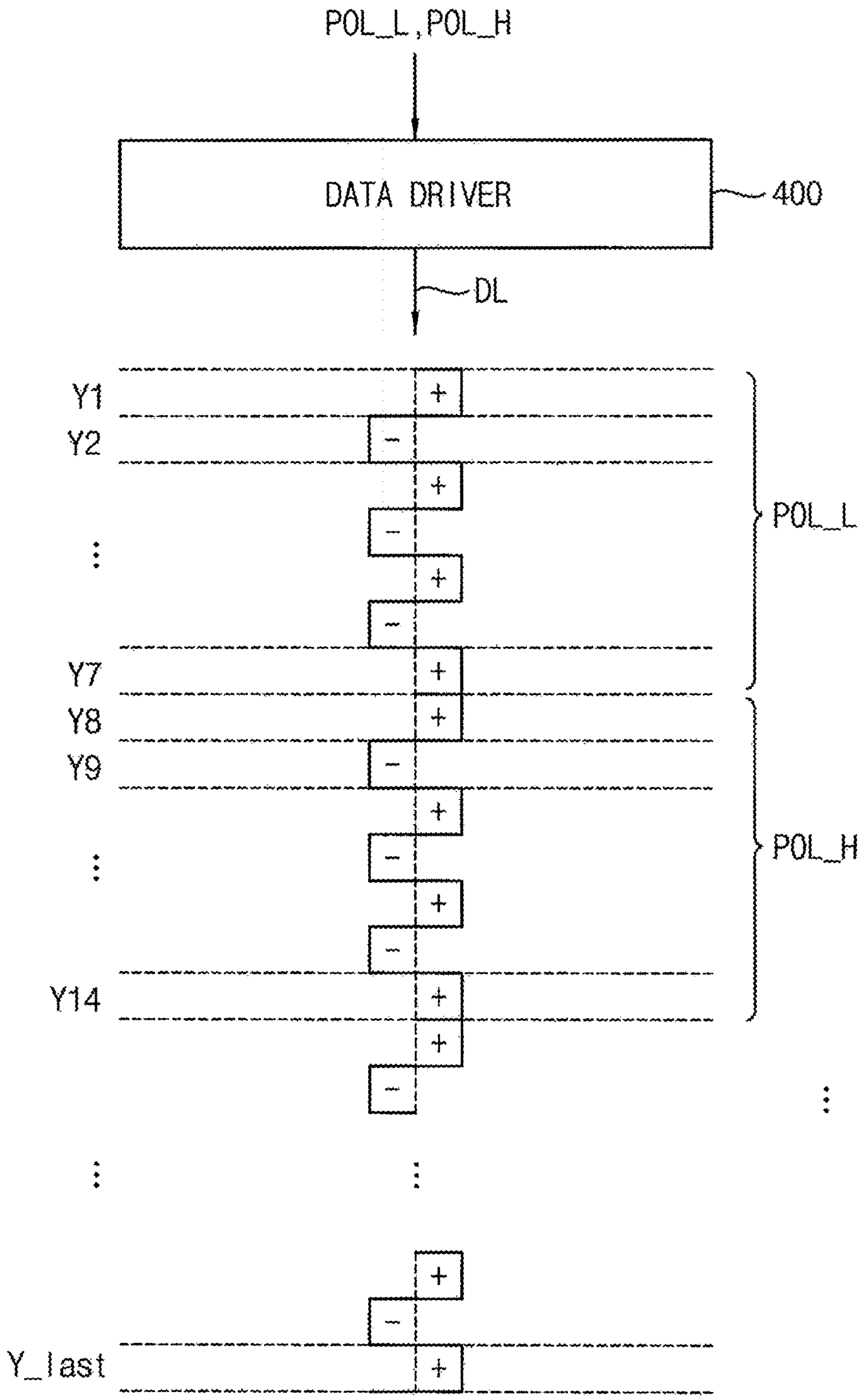
FIG. 7 is a conceptual diagram illustrating a method of controlling a polarity for image data of an afterimage pattern according to an exemplary embodiment.

FIG. 5 is a block diagram illustrating a data driver according to an exemplary embodiment. FIGS. 6A and 6B are conceptual diagrams illustrating a method of controlling a polarity for normal image data according to an exemplary embodiment. FIG. 7 is a conceptual diagram illustrating a method of controlling a polarity for image data of an afterimage pattern according to an exemplary embodiment.

Referring to FIGS. 1, 3 and 5, an exemplary embodiment of the data driver 400 may include a shift-register 410, a sampling latch 420, a holding latch 430, a gamma voltage generator 440, a digital-to-analog convertor 450 and an output buffer 460.

The shift-register 410 is configured to receive a shift clock signal SCK and a start pulse signal SPS from the timing controller 200, and sequentially generate k sampling signals using the start pulse signal SPS by one cycle of the shift clock signal SCK. Here, k is a natural number The sampling latch 420 is configured to sequentially store k image data DATA corresponding to a horizontal line in response to the k sampling signals.

The holding latch 430 is configured to simultaneously store the k image data and provide the k image data to the digital-to-analog converter 450 in response to a load signal TP provided from the timing controller 200.

The gamma voltage generator 440 is configured to generate positive polarity gamma voltages (gamma voltages of positive polarity) or negative polarity gamma voltages (gamma voltages of negative polarity) based on a plurality of gamma-data G_DATA and the polarity control signals POL_L and POL_H provided from the gamma-data generator 300. The positive polarity and negative polarity gamma voltages are provided to the digital-to-analog converter 450.

The digital-to-analog convertor 450 is configured to convert k image data to k positive polarity data voltages or negative polarity data voltages using the first and second polarity control signal POL_L and POL_H and the positive polarity and negative polarity gamma voltages provided from the timing controller 200.

The output buffer 460 is configured to amplify the k positive polarity data voltages or the k negative polarity data voltages provided from the digital-to-analog converter 450 and to output the k data voltages of the positive polarity or the negative polarity to k data lines through k output channels CH1, CH2, . . . , CHk.

According to an exemplary embodiment, the timing controller 200 may adjust the change period of the first and second polarity control signals POL_L and POL_H by every frame period based on an image data analysis result and then, the data driver 400 may output the k data voltages of the positive polarity or the negative polarity to the k data lines through the k output channels CH1, CH2, . . . , CHk based on the first or second polarity control signal POL_L or POL_H.

In an exemplary embodiment, as shown in FIG. 6A, when the image data of the n-th frame (n_th FRAME) are the normal image data that do not satisfy the condition of the afterimage pattern, the timing controller 200 provides the first polarity control signal POL_L or the second polarity control signal POL_H to the data driver 400 according to the inversion mode set during the n-th frame (n_th FRAME).

During the n-th frame (n_th FRAME), the data driver 400 outputs data voltages having a polarity order such as (+, −, +, −, +, −, +, −, . . . ) to the data line DL by every horizontal period based on the first polarity control signal POL_L provided from the timing controller 200.

In such an embodiment, as shown in FIG. 6B, when the image data of the n-th frame ((n+1)_th FRAME) are the normal image data that do not satisfy the condition of the afterimage pattern, the timing controller 200 provides the second polarity control signal POL_H opposite to the first polarity control signal POL_L to the data driver 400 during the (n+1)-th frame ((n+1)_th FRAME).

During the (n+1)-th frame ((n+1)_th FRAME), the data driver 400 outputs data voltages having a polarity order such as (−, +, −, +, −, +, −, +, . . . ) to the data line DL by every horizontal period based on the second polarity control signal POL_H provided from the timing controller 200.

In an exemplary embodiment, as described above, when the image data of the frame are the normal image data, the positive polarity and the negative polarity of the data voltages applied to the data line by every horizontal period have a symmetrical structure. Thus, the number of the positive horizontal period, in which the data voltage of the positive polarity is outputted to the data line, in a frame period may be equal to the number of the negative horizontal period, in which the data voltage of the negative polarity is outputted to the data line, in the frame period.

In an exemplary embodiment, as shown in FIG. 7, when the image data of the n-th frame (n_th FRAME) are the abnormal image data that satisfy the condition of the afterimage pattern, the timing controller 200 controls to alternately apply the first polarity control signal POL_L and the second polarity control signal POL_H to the data driver 400 during the n-th frame (n_th FRAME). In one exemplary embodiment, for example, the timing controller 200 provides the first and second polarity control signals POL_L and POL_H that change from one to the other by 7-horizontal periods to the data driver 400.

In the n-th frame (n-th FRAME), during first to seventh horizontal period Y1, . . . , Y7, the data driver 400 outputs the data voltages having polarities such as (+, −, +, −, +, −, +) which are preset in the first to seventh horizontal periods Y1, . . . , Y7 in response to the first polarity control signal POL_L. During eighth to fourteenth horizontal periods Y8, . . . , Y14, the data driver 400 outputs the data voltages having polarities such as (+, −, +, −, +, −, +) which are preset in the first to seventh horizontal periods Y8, . . . , Y14 in response to the second polarity control signal POL_H.

Although not shown in figures, as described above, during 15-th to 21st horizontal periods Y15, . . . , Y21, the data driver 400 outputs the data voltages having polarities such as (+, −, +, −, +, −, +) which are preset in the 15-th to 21st horizontal periods Y15, . . . , Y21 in response to the first polarity control signal POL_L. During 22-th to 28-th horizontal periods Y22, . . . , Y28, the data driver 400 outputs the data voltages having polarities such as (+, −, +, −, +, −, +) which are preset in the 22-th to 28-th horizontal periods Y22, . . . , Y28 in response to the second polarity control signal POL_H.

Therefore, when the image data of the frame are the abnormal image data that satisfy the condition of the afterimage pattern, the positive polarity and negative polarity of the data voltage applied to the data line may have an asymmetric structure.

By the kickback effect, a charge rate of a negative polarity data voltage is greater than the charge rate of a positive polarity data voltage. Thus, the first and second polarity control signals may be changed from one to the other by a preset horizontal period in a way such that a number of the data voltage having the negative polarity in a frame is less than a number of the data voltage having the positive polarity in the frame. The charge rate difference between the data voltages of the positive polarity and the negative polarity voltage may be compensated and thus, the afterimage may be effectively prevented.

Figure 8:
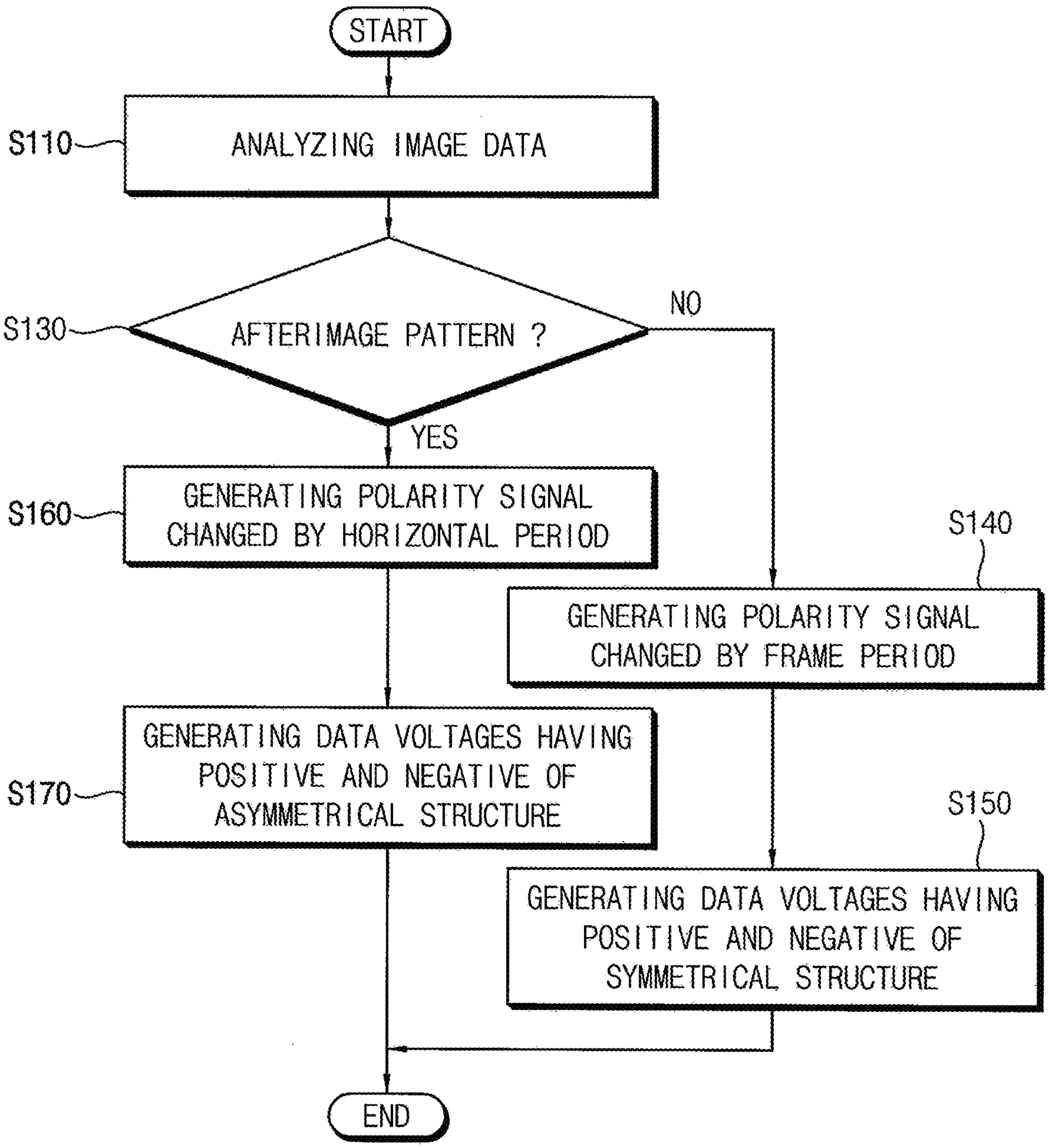
FIG. 8 is a flowchart illustrating a method of driving a display device according to an exemplary embodiment.

FIG. 8 is a flowchart illustrating a method of driving a display device according to an exemplary embodiment.

Referring to FIG. 8, the image data analyzer is configured to determine whether the image data of the frame are the abnormal image data satisfying the condition of the after-image pattern or the normal image data not satisfying the condition of the afterimage pattern (S110).

The polarity signal controller is configured to generate a first polarity control signal POL_L and a second polarity control signal POL_H and adjust the change period of the first polarity control signal POL_L and the second polarity control signal POL_H based on the analysis result of the image data analyzer.

In an exemplary embodiment, when it is determined that the image data of the frame are the normal image data not satisfying the condition of the afterimage pattern based on the analysis result (S130), the polarity signal controller is configured to provide the first polarity control signal POL_L and the second polarity control signal POL_H that are changed from one to another by a preset frame period to the data driver (S140).

In one exemplary embodiment, for example, as shown in FIGS. 6A and 6B, the data driver alternately receives the first polarity control signal POL_L and the second polarity control signal POL_H by 1 frame period.

During the n-th frame (n_th FRAME), the data driver outputs data voltages having a polarity order such as (+, −, +, −, +, −, +, −, . . . ) to the data line DL by every horizontal period based on the first polarity control signal POL_L provided from the timing controller (S150).

During the (n+1)-th frame ((n+1)_th FRAME), the data driver outputs data voltages having a polarity order such as (−, +, −, +, −, +, −, +, . . . ) to the data line DL by every horizontal period based on the second polarity control signal POL_H provided from the timing controller 200 (S150).

In such an embodiment, as described above, when the image data of the frame are the normal image data, the positive polarity and the negative polarity of the data voltages applied to the data line by every horizontal period have a symmetrical structure. Thus, the number of the data voltage having the positive polarity may be equal to the number of the data voltage having the negative polarity.

In such an embodiment, when it is determined that the image data of the frame are the abnormal image data satisfying the condition of the afterimage pattern based on the analysis result (S130), the polarity signal controller is configured to provide the first polarity control signal POL_L and the second polarity control signal POL_H that are changed by a preset horizontal period to the data driver (S160).

In one exemplary embodiment, for example, as shown in FIG. 7, the data driver alternately receives the first polarity control signal POL_L and the second polarity control signal POL_H by every 7-horizontal periods in the frame period (S160).

In the n-th frame (n_th FRAME), during first to seventh horizontal period Y1, . . . , Y7, the data driver outputs the data voltages having polarities such as (+, −, +, −, +, −, +) which are preset in the first to seventh horizontal periods Y1, . . . , Y7 in response to the first polarity control signal POL_L. During eighth to fourteenth horizontal periods Y8, . . . , Y14, the data driver outputs the data voltages having polarities such as (+, −, +, −, +, −, +) which are preset in the first to seventh horizontal periods Y8, . . . , Y14 in response to the second polarity control signal POL_H.

Although not shown in figures, as described above, during 15-th to 21st horizontal periods Y15, . . . , Y21, the data driver outputs the data voltages having polarities such as (+, −, +, −, +, −, +) which are preset in the 15-th to 21st horizontal periods Y15, . . . , Y21 in response to the first polarity control signal POL_L. During 22-th to 28-th horizontal periods Y22, . . . , Y28, the data driver outputs the data voltages having polarities such as (+, −, +, −, +, −, +) which are preset in the 22-th to 28-th horizontal periods Y22, . . . , Y28 in response to the second polarity control signal POL_H (S170).

Therefore, when the image data of the frame are the abnormal image data that satisfy the condition of the after-image pattern, the positive polarity and negative polarity of the data voltage applied to the data line may have an asymmetric structure.

By the kickback effect, a charge rate of a negative polarity data voltage is greater than the charge rate of a positive polarity data voltage. Thus, the first and second polarity control signals may be changed from one to the other by a preset horizontal period in a way such that a number of the data voltage having the negative polarity is less than a number of the data voltage having the positive polarity. The charge rate difference between the data voltages of the positive polarity and the negative polarity voltage may be compensated and thus, the afterimage may be effectively prevented.

Exemplary embodiments of the invention may be applied to a display device and an electronic device having the display device, e.g., a computer monitor, a laptop, a digital camera, a cellular phone, a smart phone, a smart pad, a television, a personal digital assistant ("PDA"), a portable multimedia player ("PMP"), a MP3 player, a navigation system, a game console, a video phone, etc.

The invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A display device comprising:

a display panel including a pixel connected to a data line and a gate line;

an image data analyzer which analyzes whether frame image data satisfy a condition of an afterimage pattern;

a polarity signal controller which generates a polarity control signal to control a polarity of a data voltage applied to the data line to be a positive polarity or a negative polarity with respect to a reference voltage; and a data driver which outputs the data voltage of the positive polarity or the negative polarity to the data line based on the polarity control signal by a horizontal period, wherein a number greater than zero of a positive horizontal period, in which the data voltage of the positive polarity is outputted to the data line, in a frame period is different from a number greater than zero of a negative horizontal period, in which the data voltage of the negative polarity is outputted to the data line, in the same frame period when the frame image data satisfy the condition of the afterimage pattern.

2. The display device of claim 1, wherein the number of the negative horizontal period in the frame period is less than the number of the positive horizontal period in the frame period when the frame image data satisfy the condition of the afterimage pattern.

3. The display device of claim 1, wherein a difference between the number of the negative horizontal period in the frame period and the number of the positive horizontal period in the frame period increases when a charge rate difference between the data voltages of the positive polarity and the negative polarity increases.

4. The display device of claim 1, wherein the number of the negative horizontal period in the frame period and the number of the positive horizontal period in the frame period is determined based on an offset of the reference voltage by a kickback.

5. The display device of claim 2, wherein the number of the negative horizontal period in the frame period is equal to the positive horizontal period in the frame period when the frame image data do not satisfy the condition of the afterimage pattern.

6. The display device of claim 1, wherein the polarity signal controller generates a first polarity control signal to control the polarity of the data voltage based on a first polarity pattern, in which a polarity of the data voltage is predetermined for every horizontal period, and a second polarity control signal to control the polarity of the data voltage based on a second polarity pattern which is inverted with the first polarity pattern.

7. The display device of claim 6, wherein the polarity signal controller changes the first polarity control signal and the second polarity control signal from one to the other by a predetermined horizontal period, when the frame image data satisfy the condition of the afterimage pattern.

8. The display device of claim 6, wherein the polarity signal controller changes the first polarity control signal and the second polarity control signal from one to the other by a predetermined frame period, when the frame image data do not satisfy the condition of the afterimage pattern.

9. The display device of claim 1, wherein the afterimage pattern includes a black image and a white image which are arranged as a grid shape.

10. The display device of claim 1, wherein the data driver comprises:

a gamma voltage generator which generates gamma-data into a gamma voltage of the positive polarity or a gamma voltage of the negative polarity based on the polarity control signal; and a digital-to-analog converter which converts image data to the data voltage of the positive polarity or the data voltage of the negative polarity using the gamma voltage of the positive polarity or the gamma voltage of the negative polarity.

11. A method of driving a display device which comprises a pixel connected to a data line and a gate line, the method comprising:

analyzing whether frame image data satisfy a condition of an afterimage pattern;

generating a polarity control signal to control a polarity of a data voltage applied to the data line to be a positive polarity or a negative polarity with respect to a reference voltage; and outputting the data voltage of the positive polarity or the negative polarity to the data line based on the polarity control signal by a horizontal period, wherein a number greater than zero of a positive horizontal period, in which the data voltage of the positive polarity is outputted to the data line, in a frame period is different from a number greater than zero of a negative horizontal period, in which the data voltage of the negative polarity is outputted to the data line, in the same frame period when the frame image data satisfy the condition of the afterimage pattern.

12. The method of claim 11, wherein the number of the negative horizontal period in the frame period is less than the number of the positive horizontal period in the frame period when the frame image data satisfy the condition of the afterimage pattern.

13. The method of claim 11, wherein a difference between the number of the negative horizontal period in the frame period and the number of the positive horizontal period in the frame period increases when a charge rate difference between the data voltages of the positive polarity and the negative polarity increases.

14. The method of claim 11, wherein the number of the negative horizontal period in the frame period and the number of the positive horizontal period in the frame period is determined based on an offset of the reference voltage by a kickback.

15. The method of claim 12, wherein the number of the negative horizontal period in the frame period is equal to the positive horizontal period in the frame period when the frame image data do not satisfy the condition of the afterimage pattern.

16. The method of claim 11, the generating the polarity control signal comprises:

generating a first polarity control signal to control the polarity of the data voltage based on a first polarity pattern, in which a polarity of the data voltage is predetermined for every horizontal period, and a second polarity control signal to control the polarity of the data voltage based on a second polarity pattern which is inverted with the first polarity pattern.

17. The method of claim 16, the generating the polarity control signal further comprises:

changing the first polarity control signal and the second polarity control signal from one to the other by a predetermined horizontal period, when the frame image data satisfy the condition of the afterimage pattern.

18. The method of claim 16, the generating the polarity control signal further comprises:

changing the first polarity control signal and the second polarity control signal from one to the other by a predetermined frame period, when the frame image data do not satisfy the condition of the afterimage pattern.

19. The method of claim 11, wherein the afterimage pattern includes a black image and a white image which are arranged as a grid shape.

20. The method of claim 11, further comprising:

generating gamma-data into a gamma voltage of the positive polarity or a gamma voltage of the negative polarity based on the polarity control signal; and converting image data to the data voltage of the positive polarity or the data voltage of the negative polarity using the gamma voltage of the positive polarity or the gamma voltage of the negative polarity.

* * * * *